United States Patent [19]

Chen

[11] Patent Number: 5,596,631
[45] Date of Patent: Jan. 21, 1997

[54] STATION CONTROLLER FOR DISTRIBUTED SINGLE LINE PABX

[76] Inventor: Abraham Y. Chen, 2035 Tripiano Ct., Mountain View, Calif. 94040-3870

[21] Appl. No.: 317,930

[22] Filed: Oct. 5, 1994

[51] Int. Cl.$^6$ ............................ H04M 1/00; H04M 13/00
[52] U.S. Cl. ........................... 379/177; 379/157; 379/158; 379/159; 379/160; 379/165; 379/182; 379/184
[58] Field of Search ................................ 379/157–161, 379/165, 177, 182, 184, 186, 202, 204–205

[56] References Cited

U.S. PATENT DOCUMENTS

| | | | |
|---|---|---|---|
| 4,219,700 | 8/1980 | Panizzon | 379/184 |
| 4,984,263 | 1/1991 | Evn | 379/158 |
| 4,985,916 | 1/1991 | Tachuk | 379/184 |
| 5,022,069 | 6/1991 | Chen | 379/157 |
| 5,031,210 | 7/1991 | Taniguchi | 379/165 |
| 5,317,631 | 5/1994 | Chen | 379/165 |
| 5,425,089 | 6/1995 | Chan | 379/182 |

*Primary Examiner*—Wellington Chin
*Assistant Examiner*—Vijay Shankar
*Attorney, Agent, or Firm*—Monte Lien

[57] ABSTRACT

A telephone station instrument add-on control subsystem with selectable addressing and ringing response delay techniques enhances any conventional instrument by providing added functionalities to ordinary telephone subscribers. When one or more of this enhanced station instruments are used on the same telephone line, a distributed single line PABX is formed. The formation of this system is based on the continuity of a pair of ordinary telephone wires. The specific routing of this wire pair does not affect the characteristics of the service features. A special case of this distributed system is to provide local dialed intercom services for communications among locations within an isolated area. A simplified version of this invention can be applied to improve the efficiency of data communication in a Local Area Network whose terminal information speed is comparable to the channel bandwidth of the transmission medium.

6 Claims, 5 Drawing Sheets

5,596,631

STATION CONTROLLER FOR DISTRIBUTED SINGLE LINE PABX

TECHNICAL FIELD

This invention relates to on-premises telephone switching systems.

BACKGROUND OF THE INVENTION

To establish communication among telephone instruments, a method of connecting the desired stations is needed. The original direct connections quickly gave way to the switching systems. The basic concept of telephone switching systems is to centralize the routing process by utilizing shared resources. The service is then delivered to the destined subscribers through individualized direct cabling. The main advantage for this is to provide the "addressability" to each subscriber so that they can assume their individual identity. This paved the way to the modern direct dialing telephone network. One drawback of this architecture is that a connection between two physically adjacent stations have to be done by wiring route that traverses from one station to the central switching system, then travels back practically the exact same route again to the second station. Obviously, it would be advantageous to use only one single run of wiring to connect both stations, especially, if these stations are far away from the switching equipment with the traffic to and from these stations from other subscribers being generally rather light compared to that between them. The party-line service was a good example of a classical engineering achievement in reducing telephone wiring for rural areas. Although there were certain operational limitations, it demonstrated the economical benefits of providing the basic telephone service to remote subscribers. Another example is at private residences, where multiple station sets may be installed in different rooms throughout the premises and connected by "parallel" wiring. This provides the convenience of being able to use the telephone service without being restricted to one particular room. However, there are certain disadvantages:

First, although a call can be originated from any location where an instrument is available, an incoming call would also indiscriminately alert all instruments at the same time. A wrong number call in the middle of the night often makes the person who gets waken up wonder whether having a telephone set in the bedroom was a right idea in the first place. Also, with more than one person on the same premises that normally expects receiving telephone calls, it is distracting to everyone when the phone rings. Who should answer it is the first reaction. More than often, the call is not for the person who eventually picks up the receiver. On the other hand, because of the telephone company's equipment performance criteria, a maximum of five phones with active bell connections is allowed on the same line. This restricts some of the station instruments from having their ringers connected.

In addition, there is no way to use a telephone set in one room to alert and then to converse with a person in another room, even though both rooms are equipped with telephone sets.

Furthermore, there has been increasing number of special purpose station instruments such as Telephone Answering Device (TAD), facsimile (FAX), computer modem, security alarm, etc, in recent years. These instruments offer diversified telecommunication capabilities. However, for uniformity in interface, each of these devices is designed to be used directly on a telephone line. Without proper installation arrangement, each of these instruments would occupy a subscriber line even though they are in standby mode most of the time. With subscribers becoming more sophisticated and utilizing various telecommunication equipment, many have to subscribe to more than just one single line service from the telephone company. Since each line requires a telephone number to be identified by the switching system in providing the service, this has contributed, at least partially, to the rapid depletion of the available telephone numbers in the national numbering plan.

In the business environment, a Private Branch exchange (PBX) switching machine providing the local concentration function can relieve some of these problems. A PBX can have more station instruments installed and be in use at a given time than the number of lines available from the telephone company. My Modular Automatic Telephone Switching System (MATSS) (U.S. Pat. No. 5,022,069) further offered an economical solution to the above applications for very small telephone installations. At its simplest form, a stand-alone module called Master Switching Unit (MSU) could be set up to supervise a single line telephone service with the equivalent function of a PBX. Compared to the conventional PBX, the MATSS concept even has an integral automated attendant function which has become increasingly important for small businesses who need to project the same professional image as the large companies, but can not afford the expense of an operator, a receptionist or a full sized automated attendant equipment. Thus, the MATSS can be classified as a PABX (Private Automatic Branch exchange).

The single line MSU approach has been proven to be very effective for a small business. However, one physical limitation during installation remains an impedance to the general acceptance of it: Since the wiring for all stations on a single line service is traditionally "parallel", it is not possible for the MSU to treat each station with individual identity, unless they are re-connected to the MSU via individualized direct cables. Although it can be done quite straightforwardly, this subject is difficult for residential subscribers to comprehend and to actually put in new cables for the direct wiring between the MSU and the individual telephone outlets.

SUMMARY OF THE INVENTION

This document discloses a novel technique that is based on the above referenced patent, and the skill evolved through commercial practices of such a product.

In accordance with my invention, a local switching system comprises, one or more fully featured Station Controller (SC) that is able to provide call switching functions and business features to a single line telephone subscriber. The SC's are interconnected via parallel wiring. The basic architecture of this switching system is totally "Peer-to-peer". Every SC is equivalent to any other SC's in the same system. There is no supervising module in this switching system. Optionally, a Master Control (MC) unit can be used to enhance the capability of the system. Of course, this will be achieved with some additional efforts and expenses.

The concept disclosed here involves techniques that allow the distribution of the MSU control intelligence to each station, while maintaining the general operation concept of the MSU. The original on-premises parallel wiring among the station sets need not be disturbed at all. At its simplest form, the present invention allows the set up of a local telephone or a dialed intercom service in a small community with a single pair of "bus" wires that has arbitrary "branches" and multiple "drop wires" connected to each subscriber. The bus need be energized only by a simple power supply, without any intelligence at all.

One of the key techniques employed in the current invention is discovered in commercializing the single line MATSS (MSU) o When this unit is installed in a single line environment, such as an office in a home, often it is not possible to immediately re-wire all of the original telephone outlets to be on individualized direct cabling behind the MSU. Certain station sets are thus left in service with the original wiring, which essentially work in parallel with the MSU. Consequently, these station sets would ring when a call comes in from the telephone company. The incoming call can be answered from one of these instruments as in the past. Then, if it is determined that the caller is trying to reach a station controlled by the MSU (e.g. the facsimile machine in the study) the party who answers the call could transfer the call by dialing a DTMF sequence consisting a leading "#" as a command followed by the address code of the MSU station port for the facsimile machine and then hang up the receiver. The MSU would hold the line while applying ringing signal to the facsimile machine. When it answers, connection to the caller is established through the MSU. Facsimile transmission can proceed as usual.

With the MSU's ability to handle the above scenario, it follows that it is possible to form a distributed PABX by connecting multiple units of the single line MSU in parallel. Each unit is assigned with a unique address or identification code. Thus, although all units are constantly monitoring the same DTMF command signals on the same line, only one will respond if a command is properly structured with the address code matching with that SC's identification code. In addition, by removing the original incoming ringing detector circuit, these units will not respond to incoming calls. Thus, it is possible to have many of these units on the same telephone line without loading down the host switch's ringing generator.

The auto-attendant function of this distributed PABX system can be accomplished by simply connecting a TAD (which could be as simple as an answering machine, a digital announcer, or a computer based voice recording and playback machine, etc.) to the line. When incoming call ringing is detected, the TAD goes offhook to greet the caller. If the caller dials a proper DTMF signal sequence matching with one of the SC module's address code, that module would go offhook by putting a dummy load across the line and starts to apply ringing signal toward its station port. The introduction of the dummy load would lower the voltage on the line. Most of the modern TAD's are designed to recognize this disturbance as "EXTension INTerrupt" (EXT INT) which triggers the TAD's automatic disconnect and reset processes. Thus, the line becomes being held only by the selected SC module's dummy load until a station instrument behind it answers. At that point, a loop connection is formed from the station set through the SC, via the telephone line to the main switch.

At any time during the conversation, a proper DTMF sequence could activate another SC module. When the station instrument behind it answers to the ringing signal, it joins the conversation to form a conference call.

Furthermore, it is possible for any station to just go offhook then dial a similar DTMF code sequence ("#" followed by a station number) to make another SC to respond in exactly the same way. Thus, dialed intercom can be set up. However, telephone company switching machines are designed to avoid energy consumption on the subscriber lines while not in use. Setup of this kind which draws energy from the telephone line for intercom purpose without making a call through the telephone company will violet such a rule. Consequently, the above intercom session would be disrupted by warning tones from the telephone company switch as well as the eventual removal of the talk battery power.

One unique characteristics of the intercom mode in my invention is that it is possible to set up the intercom in such a way that the physical telephone line is utilized only for audio signal transmission. The stations in use do not draw any energy from it. Thus, the intercom is operated in an "onhook" condition as far as the host switch is concerned. This is advantageous because, while the intercom is in progress, this allows calls from other subscribers which in general is more important to come through the telephone company. Another benefit of this techniques is that the number of conferencing stations is practically un-limited because each SC is supplying the talk battery energy to the station instrument it controls. There is no loading effect on the shared telephone line as the size of a conference grows larger.

Although ringing detector is not necessary for the basic setup of my invention, an optional feature which allows the station owner to arbitrarily set the number of ringing delays is included in this invention for satisfying one of the consumer's special desires.

The advantage of the present invention is that the SC's can be made with identical components consisting of address and incoming call ringing delay selection switches for the owner to customize to any combinations of personal choices.

With a privacy control circuitry, it is possible to protect the privacy of the parties already engaged in conversation. A barge-in control circuit is disclosed which can prevent any station from accidentally intruding into a conversation. Furthermore, an arrangement is disclosed which allows any station to purposely barge into a conversation for emergency situations even though other parties are already using the line. An intrusion pilot tone technique, analogous to the traditional operator barge-in procedure used in telephone companies is described so that the parties in conversation will be warned of the intrusion.

Advantageously, the switching modules of my invention may be used in parallel to form a PABX on any single telephone line service from the Public Switched Telephone Network (PSTN). Alternatively, my invention may be employed to establish a stand-alone local telephone or dialed intercom service. In such cases, there is no need for a telephone central office. Every station is fully equivalent to one another.

With the possibility of localized telephone or dialed intercom service, my current invention can be used as a basis for peer-to-peer data communication Local Area Network (LAN) that uses individualized address codes to set up direct and exclusive link between two terminals for the duration that communication is needed, although all terminals are connected to the same physical transmission medium. This common transmission medium is released for other terminals to use, when communication between the first two terminals is completed. For systems that the terminal speed is comparable to the transmission channel capacity, this can maximize the system performance and channel throughput by avoiding the protocol overhead made necessary by collision avoidance in the traditional data communication LAN's.

Of course, there are some limitations in this approach. First, the private consultation capability of the MATSS is no longer possible. Because, during the transferring process, the outside party is constantly connected. On the other hand, without being put on hold appears to be a plus factor for the single line applications. Since the outside party remains connected, there is no worry about whether the connection has been disrupted. This has been shown from MATSS experience as a major psychological concern for many subscribers in the single line residential environment, because most of them are not used to the silence on the telephone line during the "hold" and "transfer" processes of PBX operations.

Also, because the dialed intercom in my invention can operate in an "onhook" mode, the host switch will not be informed of this activity. Consequently, it will attempt to extend an incoming call when it arrives. The ringing signal superimposed on the line being used by intercom will be heard by the parties engaged in intercom. They have to terminate the conversation to allow the call to come through. Even if they ignore it, the greeting TAD will answer after its preset number of ringing delays. Then, the two conversations will be mixed.

Lastly, this basic system would also suffer a "end-to-end" DTMF command signal transparency problem. After my invention becomes popular, there will be frequent cases that subscribers on both ends of a telephone connection are utilizing this same facility. Because the telephone company switch, after establishing a connection, would transmit all audio signals without reacting to any, the DTMF command signals utilized in my invention would be detected by all SC's on both ends, regardless which station instrument issued such command sequence. Since all SC's are constructed with the same design, if the address identification in the DTMF command string happened to also exist in the remote system, the corresponding remote SC would respond in the exact the same way as the intended local unit. Due to the "no-privacy" arrangement of the basic system architecture, this will cause no serious harm. However, there will definitely be confusions such as both the intended and the un-intended stations will be rung simultaneously. Upon answer by one station, the other SC's audible ringing tone would interfere the conversation. When someone answers from the un-intended station, that party has to be told to hang up the receiver to ignore the call. This may be manageable if that party is a human being. However, if that station is equipped with automatic instruments such as a TAD, facsimile or modem, their normal response is to put out announcement or answer tones which may last from 15 seconds to a minute before disconnect upon determination of handshake failure. Obviously, this would be disturbing for the parties already in conversation.

The above difficulties can be eliminated by the use of a Master Control (MC) unit to be described later on. This is achieved by simplifying the hardware and re-programming the logic of the MSU of my U.S. Pat. No. 5,022,069.

Some partial solutions do exist, such as making the SC's to recognize the incoming call ringing to distinguish whether they are on the originating or the terminating side of a telephone connection. Then, if the DTMF commands with "#" prefix are only used by the terminating side for transferring the call or adding parties to the conference, the SC's on the originating side can be programmed to ignore these. The DTMF commands with leading "*" prefix will be reserved for local onhook intercoms only. Thus, the DTMF transparency situation can be averted. Even under this condition, the originating side can use this onhook technique to get local parties into the conference before initiating a call to the terminating party. Thus, conferencing with parties on both ends is still possible.

Another method could be to install a specially designed SC to act as a master module, which has the intelligence of distinguishing which end of the connection it is on. The master module then commands the associated SC's to only respond to the appropriate commands.

DESCRIPTION OF THE PREFERRED EMBODIMENT

Figure 1:
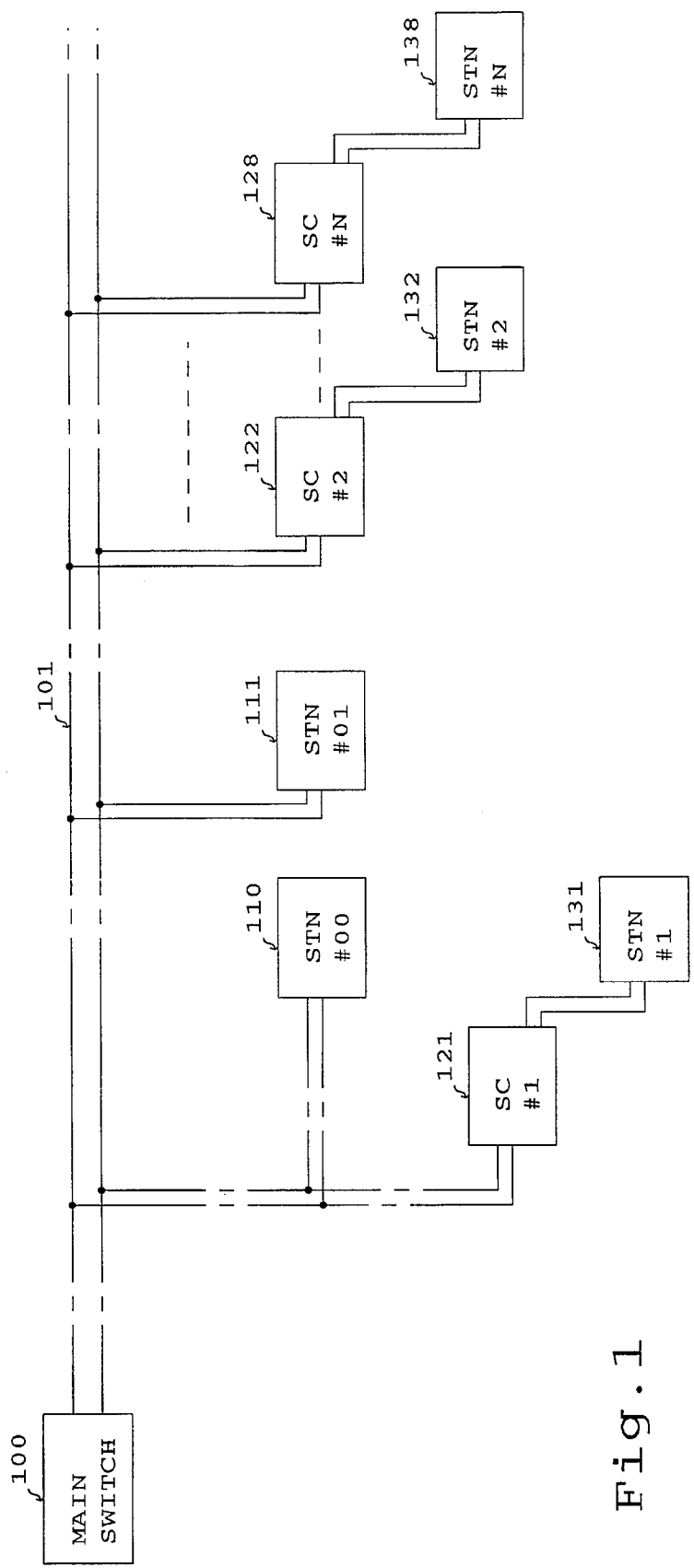
FIG. 1 is the system configuration of my invention, consisting of conventional STatioN sets (STN) and Station Controllers (SC) with station sets behind, all parallelly connected to the same pair of telephone wires from the Main Switch.

FIG. 1 presents the basic concept of the distributed single line PABX with auto-attendant function. The Main Switch 100 is the host for this system. It could be a telephone company switch, a PABX, a Key Telephone Service Unit, a Master Controller to be described later or simply a power supply. The former four provide the communication path to the outside world. The last type provides the talk battery energy for a local area network offering only intercom service.

Line 101 is the conventional tip and ring wires that are laid throughout the premises in a continuous run, or with any number of "branches" or "tap-offs". STN #00 110 and STN #01 111 are any standard telephone station instruments directly connected to the Line 101 in the conventional manner. These instruments can be used in the traditional way.

SC #1 121, SC #2 122, ... and SC #N 128, are the Station Controllers (SC) which form the basis for the distributed single line PABX of my invention. With the operation characteristics described below, these SC's offer the associated stations, STN #1 131, STN #2 132, ... and STN #N 138 the individual addressing identity in communicating with one another or with remote parties.

Figure 2:
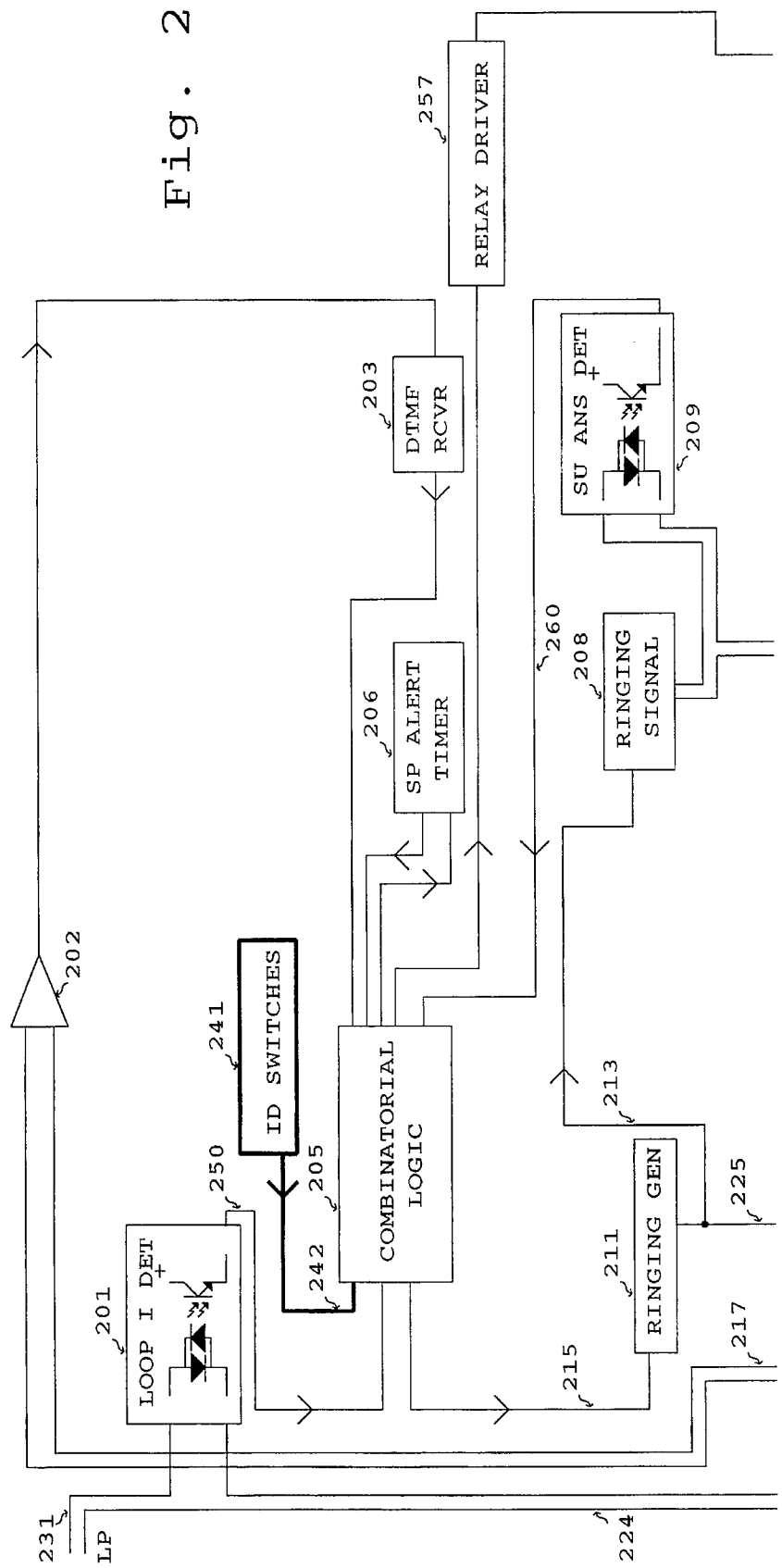
FIGS. 2 and 3 are the two parts of a basic Station Controller of the present invention. They are re-drawn from FIGS. 2 & 3, respectively of U.S. Pat. No. 5,022,069. The figures have been trimmed to retain only the portions that are utilized by the present invention. Relative positions of the functional blocks have been maintained to facilitate the comparison with the original drawings.
Figure 3:
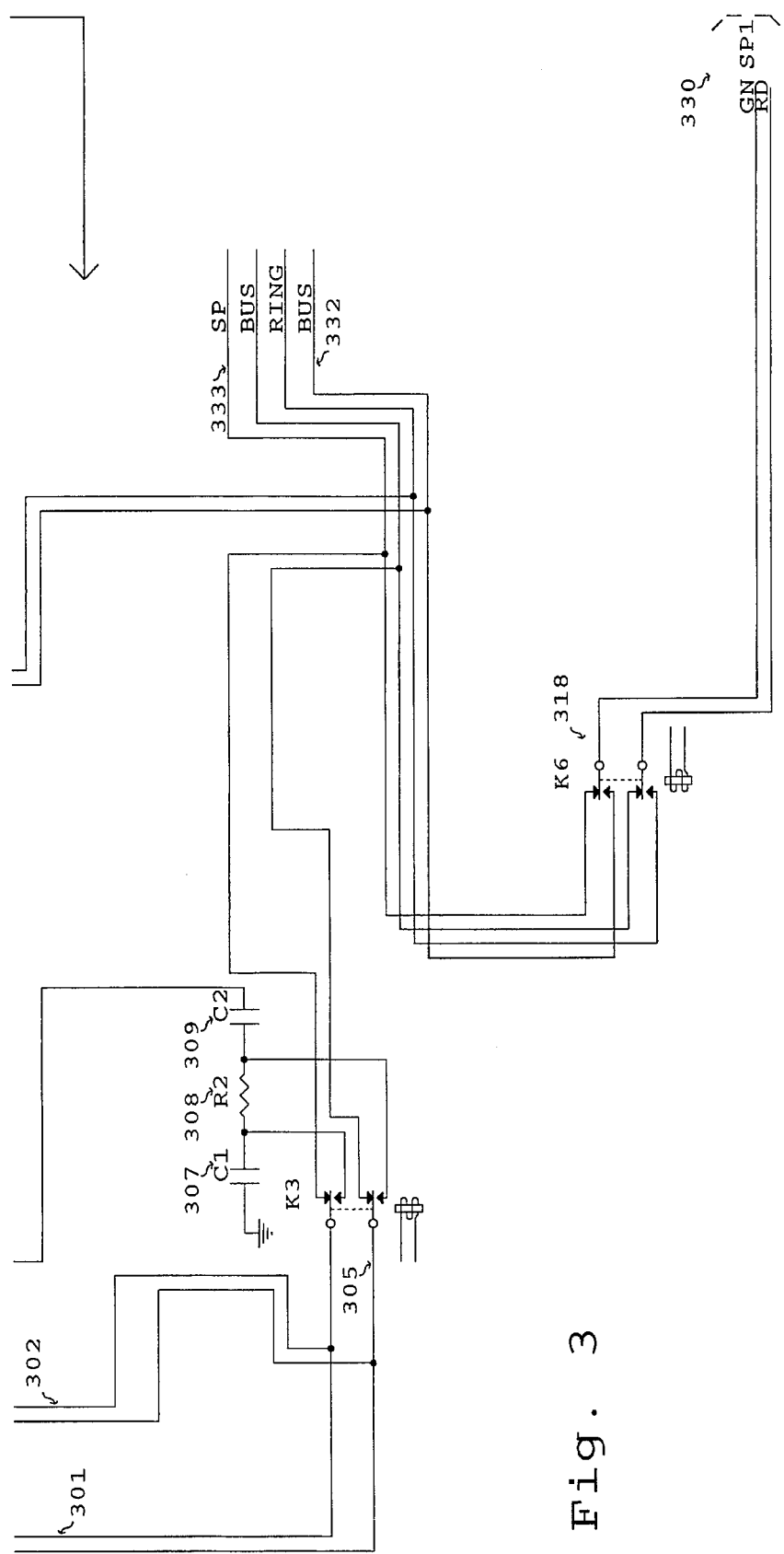

FIGS. 2 and 3 depict the functional blocks of one of the Station Controllers of FIG. 1. For the purpose of providing a complete disclosure of my invention, the detailed description of the relevant operations and features of the MSU to be found in U.S. Pat. No. 5,022,069 are incorporated herein by reference. Note that SU OFFHK Det 207, SU Busy CK 210, Ringing Det 202 and relays K4 312, K7 320, K8 314 of the original drawings have been eliminated because they are not needed for the present application. Also, rely K2 303 and Relay K5 316 have been replaced by permanent connections. Furthermore, station ports SP1 are four-wire ports in FIG. 3 of U.S. Pat. No. 5,022,069. Only the RD and GN conductors (the speech path) are employed herein; and the connected lines e.g., 330 are two-wire paths. The remaining BK and YL conductors of port SP1 are not employed in the practice of the present invention.

To facilitate the description of the Station Controller's basic operations, ID Switches 241 and conductor 242 have been included in FIG. 2. Heavy lines are used to draw these two items to highlight the additions from the referenced U.S. Pat. No. 5,022,069.

In the illustrative embodiment of my invention, each SC serves incoming requests which appear at LP 231; call origination requests which appear at station port SP1 330. A call origination request may be for originating a call through Main Switch 100, or for an intercom call to one of the stations 131–138; both via Line 101.

Normally, each Station Controller, say SC #1 121, provides local battery to the station #1 131 via the make contacts of relay K6 318 and SP1 330 of FIG. 3; Amplifier 202 for the DTMF Receiver 203 of FIG. 2 is bridged across line 231 of FIG. 2 via path 217, 302, 301 and 224; A call can come from a remote subscriber who would request Main Switch 100 to announce such an intention by applying ringing signal on Line 101. A station connected to port SP1 can originate a call to a station served by Main Switch 100 via Line 101. Additionally, the station can originate a local call to another station via Line 101, and another SC.

When an incoming call ringing is applied to Line 101, one of the directly connected stations STN #00 110, or STN #01 111 would respond. Let us assume that STN #00 110 is a TAD. It would play the pre-recorded announcement to greet the caller and to provide instruction to guide the caller to dial the extension number of the desired station. If the number dialed by the caller matches with one of the SC's preset numbers in the ID Switches 241, the corresponding Combinatorial Logic 205 will operate relay K3 305 to put the dummy load R2 308 across the line 301, turn on Ringing Gen 211. Through Ringing Signal 208, Ring Bus 332, relay K6 318, the ringing signals are applied to the station instruments on SP1 330. Simultaneously, the remote party is informed of the progress by the audible ringing tone injected from Ringing Gen 211 through path 225, coupling capacitors C1 307 and C2 309. When the station instrument answers, it is detected by SU ANS Det 209, reported via path 260 to Combinatorial Logic 205. by stopping Ringing Gen 211, releasing relays K3 305 and K6 318, the station instrument on SP1 330 is connected via SP Bus 333, Line 301, 224, LP 231 to Line 101 which is connected through Main Switch 100 to the remote caller. Conversation between the parties can begin.

Note that one unique feature of the ID Switches 241 is that it is possible to set them to assume multiple combinations of address codes so that each SC would respond to not only private calls specifically for it, but also as a part of a group call or even a broadcasting call, depending on which code the calling party uses. One obvious use of this is to try to locate someone at certain section of the premises, or make a broadcasting call to all members of the family for dinner.

If station 131 goes offhook at port SP1 330 of SC 121, SU Ans Det 209 generates a true condition on signal path 260. Combinatorial Logic circuit 205, in turn, releases K6 relay 318 to connect SP1 330 to Main Switch 100 via K3 305, path 301, 224, 231, 101. The Main Switch 100 provides talking battery and dial tone to station 131. At this point, the subscriber at station 131 may manipulate the station keypad to provide a called number to Main Switch 100. The call will proceed as a normal telephone call. When the called party answers the call, a "stable talking connection" is established through Main Switch 100, Line 101 and SC 121.

A subscriber at one of the local stations e.g., station 131 may initiate a call to another local station by first entering a keypad "#" signal and the identification number of the called local station. This signal, is detected by DTMF RCVR 203 of all other SC's and reported to their respective Combinatorial Logic 205. For the particular SC (e.g. #2) that the DTMF sequence matches with its preset combination, its Combinatorial Logic 205 causes SC #2 122 to be configured into a form for response. Namely, K3 relay 305 is activated to apply a dummy load R2 308 to cause line 101 to stay offhook. At the same time, Combinatorial Logic 205 applies ringing current to its SP1 330 port in the same way as the incoming call actions described above. Through the coupling arrangement of C1 307 and C2 309, an audible ringing tone signal is applied to Line 101 informing the originating party about the progress. When the called station STN #2 132 answers, a connection between SP1 330 and Line 101 is established as described above for incoming call. The two parties can begin intercom conversation.

Stable talking connections through SC 121 are continuously monitored by Loop I Det 201 to detect hang-up but not switch-hook flashes. Upon informed of the detection of hang-up via conductor 250, Combinatorial Logic 205 releases relay K6 318 to reconnect SU Ans Det 209 to monitor for eventual onhook by the local station 131. When the local station 131 goes onhook, the output of SU Ans Det 209 will be inactive. When both Loop I Det 201 and SU Ans Det 209 provide inactive output signals, Combinatorial Logic 205 resets the SC to the idle state, and prepares to handle another service request.

Since the Loop I Det 201 is designed to ignore switch-hook flashes, a local station may fully utilize switch-hook activated Main Switch 100 services e.g., call waiting, call transfer, conference, etc.

A stable talking condition through SC 121 is continuously monitored by DTMF receiver 203 of all other SC's on line 101 to detect requests from the subscriber for further service. For example, a subscriber at a local station involved in a stable talking connection may, by way of key pad signals, add another local station to the connection.

A subscriber at one of the local stations e.g., station 131 may direct a call to another local station by first entering a keypad "#" signal and the identification number of the desired local station. This signal, is detected by DTMF RCVR 203 of all other SC's and reported to their respective Combinatorial Logic 205. For the particular SC (e.g. #2) that the DTMF sequence matches with its preset combination, its Combinatorial Logic 205 causes SC #2 122 to be configured into a form for response. Namely, K3 relay 305 is activated to apply a dummy load R2 308 to cause line 101 to stay offhook. At the same time, Combinatorial Logic 205 applies ringing current to its SP1 port in the same way as the incoming call actions described above. Through the coupling arrangement of C1 307 and C2 309, an audible ringing tone signal is applied to Line 101 informing the originally active parties about the progress. When the called station STN #2 132 answers, a conversation path is established with the original parties to form a conference. Additional parties can be added in the same manner to form a larger conference call. Any station in the conference can drop out as wished.

As long as there is one local station remaining offhook, the connection will be maintained by the Main Switch 100.

For purposes of illustration only, the logic arrangements of the block 205 comprise sequential logic circuits, memory, and sources of timing signals to generate output signals for control of the elements of the SC of FIGS. 2 and 3. The functions of these sequential logic circuits may be implemented by stored program controlled arrangements without departing from the spirit and scope of the invention.

As call signalling information arrives on Line 101 from the calling subscriber, DTMF RCVR 203 decodes the signals, digit by digit, and passes the decoded information to Combinatorial Logic 205. This information is employed to compare with the preset station identification data on signal path 242 defined by ID Switches 241. A mis-match triggers the reset process of the Combinatorial Logic 205, assuring that the SC only responds to the exact sequence of DTMF signals that it is expecting. Since the architecture of the present invention allows the remote party to access any stations behind a SC with the proper identification code sequence, this logic increases the security protection for the station sets behind the SC.

When the full complement of call signaling information has been collected in Logic circuit 205 and the match completed, Logic circuit 205 initiates the application of a ringing current to its SP1 330.

Simultaneously, logic circuit 205 provides input control signals to Relay Driver 257 to operate a switching relay K3 305 to return a confirmation tone via Line 101 to Main Switch 100. At the same time, Combinatorial Logic circuit 205 enables SP alert timer 206 to initiate measurement of a timeout period of time e.g. 30 seconds. The timeout period of time is the maximum time that ringing current is applied to a station which fails to answer. This time period is designed to be long enough for a subscriber at the station to answer, or a TAD to respond; yet short enough so that it would not keep injecting the audible ringing tones into the system in case that neither answers.

Output signals of Logic circuit 205 on conductor 215 control Ringing Generator 211 to generate ringing signals of the correct cadence. Output signals of Ringing Generator 211 on conductor 225, by means of the network consisting of capacitor C1 307, resistor R2 308, and capacitor C2 309, provides confirmation tone to the remote party at the pair of make contacts of the K3 relay 305.

The Ringing Signal circuit 208 electrically conditions output signals of the Ringing Generator 211 on conductor 213 to provide ringing current to the called station. The SU Ans Det 209 is connected in series with one conductor of the output of the Ringing Signal 208. Port SP1 330 is connected via make contacts of relay K6 318 to receive the ringing current from Ringing Signal 208.

Relay K6 318 serves to switch the RD and GN conductors of the station port SP1 330 between SP Bus 333 and Ring Bus 332. It is monitored for offhook condition by SU Ans Det 209.

When the called station answers the call, the SU ANS DET 209 recognizes the event and generates an active signal on conductor 260. The Combinatorial Logic 205 in turn; removes the active signal from conductor 215 to terminate the generation of both the confirmation tone and the ringing signal; releases K3 relay 305 to connect the LP 231 to SP bus 333; releases the previously operated K6 relay 318 to connect the associated station port SP1 330 to the SP bus 333. Under these operating conditions, the parties on LP 231 and STN #1 are connected for communication.

During the period of a conversation, regardless of whether the connection was established while serving a main switch to extension call, an extension to a main switch call or an extension to extension call, it can be transferred to another station or a conference call can be set up.

To initiate a conference call, a party in the conversation, by means of the local DTMF pad, generates a "#" signal, then the desired station's identification code. Since all SC's are monitoring the Line 101, this DTMF information is received by all of the DTMF receiver 203 and reported to their respective logic circuit 205. If the accumulated information matches with the identification of a SC, its Combinatorial Logic 205 will respond in exactly the same manner as in the case of incoming call above. When the station instrument answers, a conference connection is formed.

Figure 4:
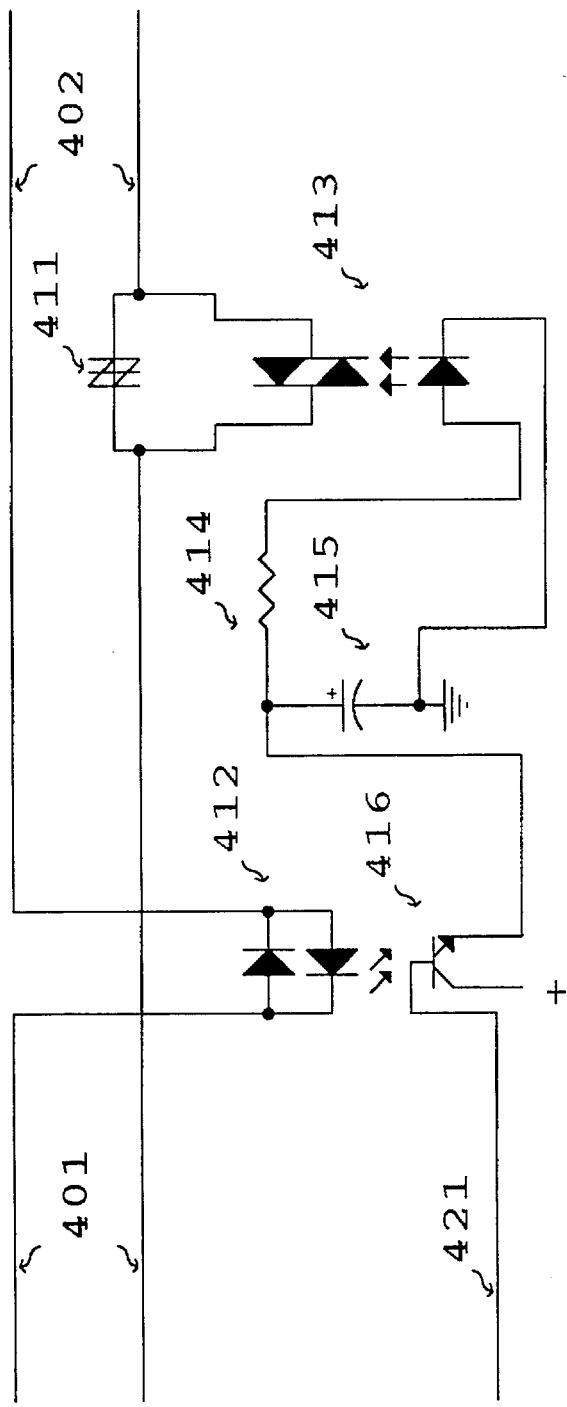
FIG. 4 is a possible barge-in control circuitry.

FIG. 4 describes a barge-in control circuitry. With a parallel setup as the present invention suggests, it is important to look into the subject of privacy protection. There are several stages of the development:

A. The first step is to setup a arrangement where only the first station requesting service can complete the loop. Telephone switching systems normally provide an energy source with voltage ranging from 24VDC (PBX and KTS) to 48VDC (PSTN). Because the internal resistance of the energy source and the line loss, when a station instrument is offhook, the voltage across the line at the station would drop to around 10VDC. Thus, an avalanche type of Silicon Bilateral Switch (SBS) 411 rated at about 20V can be used in series with each SC of the present invention. When the first station goes offhook, the line voltage exceeds the threshold of the the SBS 411. It breaks down to a very low resistance allowing the completion of the loop. Thus, this station can obtain the service from the line. When any additional station goes offhook, it will find that the line voltage is already below the breakdown voltage of its SBS. Thus, electrical path can not be completed. This prevents the new station from joining the communication.

B. The obvious limitation of the above simple minded setup is that there is no way to form a conference, and the first party could monopoly the only telephone line. So, an electronically triggerable circuit has been developed which can bypass the SBS 411 above, when an appropriate condition, such as a DTMF digit string matching with the SC's identification number, is detected. Once turned on, this circuit would maintain the electrical path with a feedback latching arrangement until the station instrument itself disconnects from the path by going onhook.

A trigger signal 421 turns on the supply energy to the Light Emitting Diode (LED) of 413, via the amplifying transistor 416 on an optical isolator 412. This turns on the TRIAC of optical isolator 413, which shorts out the SBS 411 to allow the completion of a loop with Main Switch 100 across lines 401 and the offhook station instrument across lines 402. After the loop current starts to flow, one of the LED's (depending on the direction of the loop current) in the optical isolator 412 is turned on to keep output transistor 416 energized, which feeds local power to keep the LED for the optical TRIAC 413 in ON state. Once this is established, even with the trigger signal 421 removed, this circuit latches in the "ON" state by itself. Capacitor 415 and resistor 414 store the energy and smooth out the discharging current through the LED of 413 to avoid the TRIAC of 413 from accidentally being turned off by line transients, such as switch-hook flashes.

C. Next, to avoid connection to un-intended party accidentally, we need to have a technique that allows the primary station to refrain all other stations in the same system from barging into a call setup. This can be achieved by having the Combinatorial Logic 205 to refuse to release relay K6 318 upon detection of offhook on SP1 330, after detecting ringing signal, or when the DTMF string received does not match with the SC's identification number. The former is for incoming call situation, the later is for outgoing or intercom setup.

D. The last step is to provide a barge-in capability to every station for emergency use. When a station 131 goes offhook, it is detected by SU ANS DET 209. The Combinatorial Logic 205 would release K6 318 to connect station 131 to line 101. If the line is already in use by other stations, SBS 411 prevents the connection. This results in no active output from LOOP I Det 201. Thus, Combinatorial Logic 205 would proceed to disconnect station 131 from the line 101 resulting in connecting it to the Ring Bus 332 again. As long as station 131 stays offhook, this cycle will continue causing a string of noise clicks audible from the station's receiver. Upon hearing this clicking noise, the station user should hang up the receiver and try later, or could utilize a special facility in SC, to be discussed next, to achieve barge-in.

Figure 5:
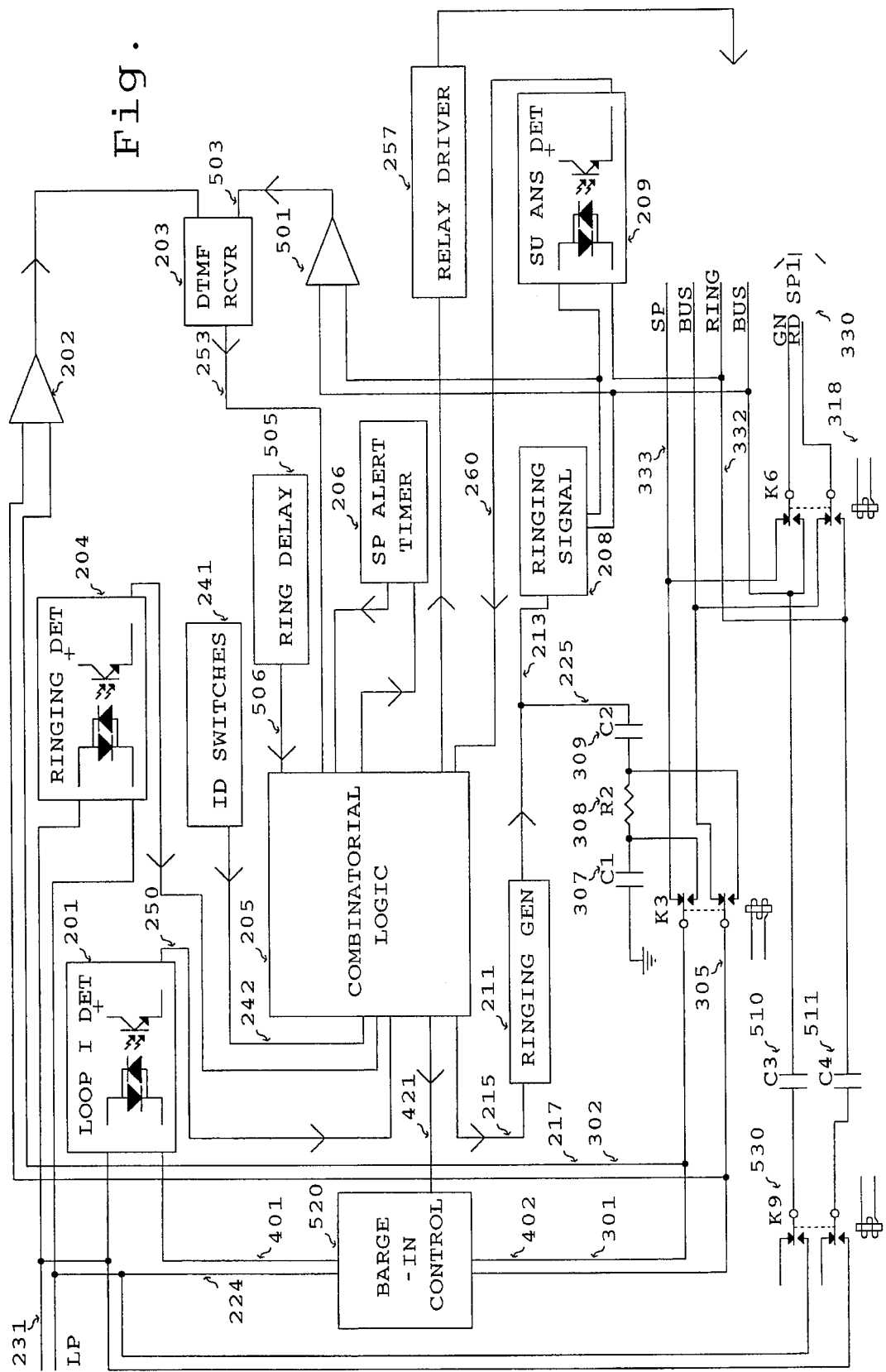
FIG. 5 is a complete Station Controller of the present invention. It is derived by combining FIGS. 2, 3 and 4. Also, there are a few enhancement subsystems included in it.

FIG. 5 depicts a complete Station Controller (SC) unit by combining FIGS. 2. and 3. The barge-in control circuit of FIG. 4 is schematically presented as a functional block 520 with trigger input 421 controlled by the Combinatorial Logic 205. There are several subsystems that have been included in this figure to complement the additional functional capabilities of the SC:

Amplifier 501 is added for detecting DTMF signal from the station when it is connected to Ring Bus 332. As discussed above, when a station is excluded from the line, the station set is toggled by the SC logic between Ring Bus 332 and Line 101 via LP 231. Because the line voltage is below the threshold of SBS 411, the only time that the station set is powered is when it is connected to the Ringing Signal 208. By having an Amplifier 501 on the Ring Bus 332, the DTMF "," signal dialed by the station user can be detected and reported, via signal path 503, DTMF RCVR 203, conductor 253 to Combinatorial Logic 205, which activates the latching circuit of FIG. 4 via signal path 421 to bypass SBS 411. Because the feedback process and human reaction time, this "*" signal will continue shortly after the station is connected to Line 101. This "," signal would therefore be heard by the parties who are already using Line 101. Thus, this tone serves as a warning pilot signal to parties in communication that someone is intruding into the conversation.

In addition, this signal path through Amplifier 501 provides another useful service. Based on the design of the Combinatorial Logic 205, any station that is behind a SC is prevented from connecting to the line during the period of ringing from the Main Switch 100. This is to prevent a station user from accidentally picking up a station instrument and gets connected to the caller which causes confusion and spoils the professional image that my invention is attempting to project. However, it is possible to purposely pick up a call when ringing is heard from the bell of a nearby station instrument. A station user behind a SC can pick up the receiver and hold down the "*" key for a moment or two to activate the latching circuit which shorts out the SBS 411 to begin the loop current flow, allowing the station user to intercept the call.

One interesting feature consumers often ask for is to not let the station bell ring until after a few cycles of the telephone company ringing signals. This is a very effective deterant to the telemarketers who would not have such patience to wait for many ringing cycles. The called party's acquaintances on the other hand, would be informed of this trick and wait for the delayed response. However, this is likely not a feature that the telephone company would ever offer. Because, while delaying to alert the called party, the telephone company's equipment is occupied to provide the audible ringing tone to the caller generating no revenue. With the present invention, this can be easily accomplished under the subscriber's direct control. For this purpose, we have put the original Ringing Detector circuit 204 back in. The owner can specify, by way of Ring Delay 505 setting and conductor 506, to the Combinatorial Logic 205 the desired number of ringings to wait before the unit would pass the ringing current on LP 231 to the instrument on SP1 330. One side benefit of this is that the number of delayed ringing in the Station Controllers for ordinary telephone sets can be set to just a little more than that of the greeting TAD. Normally, all calls will be answered by the TAD. However, if the TAD fails for any reason, the station sets would start to ring after their respective number of preset delays.

When the number of delay is set to zero, the ringing current on Line 101 would be immediately passed to SP1 330. Thus, the station instrument would receive ringing signal without delay as if the SC does not exist. With this capability, the SC of the present invention can be integrated into every conventional station set and be used with or without the ringing delays. As a result, STN #01 111 and STN #02 122 in FIG. 1 can also be station instruments with SC circuitry like other stations, except that the ringing delays in the SC's for these two stations are set to zero.

The basic operation procedure disclosed above, although very simple, has a flaw. When an intercom session is set up by the DTMF command sequence of "#" and desired station address number, the SC's will be communicating through Line 101, as well as drawing energy from Line 101 to operate the station instruments properly. Since this is a form of communication activity that the telephone company does not receive revenue, it will be viewed by the Main Switch 100 as if the Line 101 is leaking energy. Thus, Main Switch 100 is likely to respond with warning tones and to eventually remove the talk battery which disrupts the intercom. To avoid such a situation, the following is a technique used in my invention.

A special circuit arrangement utilizing high voltage capacitors C3 510 and C4 511 together with a relay K9 530 is shown in FIG. 5. They block the Direct Current (DC) from LP 231 while providing Alternate Current (AC) coupling function between the SP1 330 and the Line 101 via Ring Bus 332 and LP 231 when commanded by Combinatorial Logic 205. To initiate this type of intercom, a subscriber dials "*" immediately after offhook, then the desired station number. Under this mode of operation, the originating party's SC would activate its relay K6, 318 to provide talk battery from Ring Signal 208, via Ring Bus 332 to the station instrument and activate relay K9, 530 to complete an audio path to Line 101. The target SC's Combinatorial Logic 205 responds practically the same manner as described above except it keeps relay K3 305 released to avoid the loading effect of R2 308 during the ringing of SP1 330, and also keeping relay K6 318 energized even after station instrument on SP1 330 answers. These present an "onhook" condition to the Main Switch 100 while providing talk battery energy locally from Ringing Signal 208 to the station instrument. However, audio path between SP1 330 and Line 101 is established via C3 510, C4 511 and the make contacts of relay K9 530. Thus, audio path among the SC's is still utilizing the the common telephone wiring Line 101. Since Line 101 is the common audio signal path, more stations can be summoned to form conference by additional DTMF "*" and address codes. Note that this technique can be utilized even while communicating with remote parties through the Main Switch 100. The additional stations brought into conference with this procedure do not load down the energy supply on Line 101. Thus, a large conference is possible.

Although this allows intercom sessions to be free of disruption mentioned above, calls from other subscribers through Main Switch 100 will not be blocked because the Main Switch 100 is not aware of the intercom activity.

Another effect of this onhook configuration is that the barge-in control circuitry of other SC's will also not be aware of the intercom activity. Thus, when another subscriber lifts the receiver of a station instrument, it will be immediately connected to the conversation. However, because it enters by introducing an offhook condition, the Main Switch 100 will sense this and turns on the dialtone. This serves the same purpose of the intrusion warning tone to the parties already in the intercom, as described above.

To provide privacy during consultation and blocking incoming calls during intercom session as well as preventing the DTMF command strings issued by one station from reaching the remote party who may be also using the same single line distributed PABX of my invention, a Master Controller (MC) can be used between the Main Switch 100 and the Line 101. The MC can be a modified MSU of my U.S. Pat. No. 5,022,069. The modifications consist of a couple of hardware simplifications and some re-programming of the Combinatorial Logic 205. The processes are fairly straightforward and rather obvious to those skilled in the art. Thus, they will only be outlined below:

A. The CO line port 231 of the MSU is connected to the Main Switch 100.

B. One of the SP's of the MSU, say SP1 330 is connected to line 101 of the current invention.

C. All other telephone ports of the MSU are not used.

D. The Combinatorial Logic 205 of the MSU used for the MC purpose is re-programmed to, Disable its auto-attendant function such that incoming ringing from Main Switch 100 is passed through un-affected if the Line 101 in the current invention is idle.

Provide talk battery to Line 101. This allows intercom among SC's while Main Switch 100 treats this subscriber line as if it is idle.

If incoming ringing is detected during intercom session, the MC will activate Ringing Generator 211 very briefly for each ringing signal cycle detected by Ringing Det 204. This relays the incoming call alert to the intercom parties while the call from the Main Switch 100 is maintained in the ringing state. The intercom parties can ignore these brief reminding tones while carrying on the conversation. The reminding tones will stop when the caller from Main Switch 100 side eventually abandons the call. However, if the intercom parties decide to receive the incoming call, they can hang up the receivers to return the system to an idle state, so that the MC can pass the incoming call through.

If a DTMF signal "9" is received immediately after Line 101 goes from idle to offhook, the MC shall connect Line 101 to Main Switch 100 to allow establishing an outgoing call through the PSTN. This process resembles the "outside line access" procedure common to most of the PBX systems.

After a stable connection through the Main Switch 100 is established, if a DTMF sequence "##" is received on an incoming call, or a "#*" is received on an outgoing call, the MC puts the Main Switch 100 side on Hold. This provides a private consultation environment for the SC users while the remote party on the Main Switch 100 side is on Hold. Then, when a DTMF "#" is received from Line 101 after addressing DTMF digits have been detected indicating that an additional station has been alerted, the MC releases the Hold and connect Line 101 to Main Switch 100.

A Station Controller (SC) can operate behind the MC in the same manner as described earlier. The only modification is that an additional option for setting up intercom is now available. Since the Line 101 is now buffered from the Main Switch 100 by the MC, there is no worry about upsetting the Main Switch 100 for intercom sessions. A station user can use "#" and then address code to reach another station under all conditions. By drawing energy off Line 101 for intercom, the MC is informed of the intercom activity. Thus, it is able to block the incoming call from the Main Switch 100 to allow the intercom to continue. One added benefit of this mode of intercom is that it can also enjoy the privacy protection.

Of course, a subscriber still has the option to use "*" then address number sequence to establish an intercom. Although this has a special advantage of allowing many parties to join the conference without the worry of the energy supply limitation from MC through Line 101, the MC will not be able to prevent incoming calls from disrupting the intercom. As a consequence, parties communicating through this mode of intercom are not protected by the barge-in control circuitry, unless the MC is equipped with a dialtone generator like the Main Switch 100.

If end-to-end DTMF command transparency is the only concern, for example, in residential applications, it can be taken care of by modifying the Combinatorial Logic 205 in the SC's such that each unit is capable of identifying whether it is on the originating or terminating side of a telephone connection. This can be achieved relatively easily. If incoming ringing is detected, the SC's set themselves as on the terminating side, ready to respond to DTMF commands with leading "#". On the other hand, if DTMF signals without leading "#" is detected, the SC's assume that they are on the originating side. From that moment on, they will ignore DTMF commands with leading "#". As long as the subscribers follow the convention of using DTMF command sequence with leading "#" in transferring incoming calls, there will be no confusions. For this convention to work properly, command sequence with leading "*" should be reserved for only setting up local intercoms. Of course, both sides could still use leading "*" commands to add parties to the conference with the understanding that there is chance to alert un-intended stations.

There are many practical situations that can utilize the invention presented here. For example, Simple setup for individually addressable telephone or intercom service by utilizing only one pair of bus wires with multiple drops: The present invention allows peer-to-peer addressable telephone call without the support from the host telephone switch. The installation consists of pulling a pair of bus wires to each location needing the service and power these wires with a simple 48VDC power supply. This would be very useful for local communications in many temporary situations as well as for communication among scattered dwellings in remote villages. If dialtone generator is included in the 48VDC power supply, privacy protection among communicating parties can be provided even under the onhook intercom mode.

In business environment, a manager's SC can be set with ringing delays, so that the assistant's telephone always rings first. On the other hand, a person who serves as a backup to an officemate would set delays in the SC so that it would ring only if the primary person is not in the office.

Addressable data terminals for local area network: The present invention allows time sharing a common transmission medium as a dedicated channel. In recent years, communication among data terminals on the same physical channel has been characterized by random access from every terminal with a build-in protocol to detect simultaneous transmissions by multiple terminals and then to recover from the collisions. By utilizing the present invention, the physical channel can be seized by a data terminal when there is a need to communicate with another terminal. After completing the transmission, the channel can be release by these two terminals for the next request. This approach allows the full bandwidth of a physical channel to be utilized for actual information exchange between two communicating terminals, thus circumvents the performance and bandwidth degradations due to the traditional data communication protocol for collision avoidance. When my invention is used in the local dialed intercom mode, not only the main switch can be replaced by a simple power supply, the line interface can also be replaced by a much simpler circuit. Without the need for isolating the high voltage ringing signal from the Main Switch, much of the front-end protection circuitry in SC is not needed:

The barge-in control circuit can be replaced by a simple voltage measuring detector. If the voltage on the line is high, the line is not being used. It is ready to be seized by any SC. If the line voltage is low, indicating someone is utilizing the communication channel. All SC's except the one initiated the seizure should refrain from getting on-line.

Whenever a data terminal needs to communicate, it first assures that the line is idle by checking for full line voltage. After bridging a load across the line causing the line voltage to drop, it begins to transmit the identification code of the desired party. Only the SC of the specified terminal with matching identification code should respond.

If there happens to have more than one terminal requesting for the transmission medium, the initial handshakes would result in errors due to collision. All initiating terminals should disconnect from the line, then request again after a random amount of time delay to minimize the chance of collision again.

If this initial exchange of terminal identification is successful, the link can be assumed to be secured from other terminals' interference. Since only two parties are actively involved in the communication at a given time, there is no worry about mis-addressing the message, or interference by others. Thus, messages can be sent with minimum overhead information, resulting in much higher information transmission efficiency.

Furthermore, a simple AC coupled amplifier can be always connected across the line as a receiver. Thus, any SC, regardless whether it is an active user or not, can always receive signals been transmitted on the line. This offers a convenient broadcasting capability in this system.

The invention has been described with particular attention to its preferred embodiment; however, it should be understood that variations and modifications within the spirit and scope of the invention may occur to those skilled in the art to which the invention pertains.

What is claimed is:

1. A distributed telephone switching system connecting between a Main Switch line and one or more station sets, for providing PABX features including auto attendant, call transfer, conferencing, and intercom services to said station sets, comprising:

one or more Station Controllers, each station controller to control one station set, identically designed with, means to detect and to respond to ringing signals from said Main Switch line;

means to signal said Main Switch line for service;

means to signal other said station sets via respective said Station Controllers;

means to detect and respond to signals from remote caller via said main switch line or from other said station sets;

means to assume individualized address identity via subscriber settable ID switches;

means to provide privacy to parties in communication by detecting said main switch line in use condition and consequently denying service request by said station set under said station controller's control;

means to allow an additional said station set to generate a special request signal to superimpose on said main switch line to alert said station sets already in communication upon barge-in situations.

2. A distributed telephone switching system in accordance with claim 1, providing PABX features to said station sets with or without the use of a central controller, comprising:

one or more identically designed Station Controller modules, one for each said station set with, means to interwork among one another through the use of a parallel wiring comprising any number of arbitrary taps, and branches.

3. A distributed telephone switching system in accordance with claim 1, comprising:

One or more identically designed Station Controllers, provides transfer, conference and local intercom services to said station sets in addition to the existing single line telephone service.

4. A telephone station set enhancement subsystem, allowing one or more station sets be connected to a main switch line and be operated alone as a conventional station set or with one or more other similarly equipped said station sets to provide PABX type of services to said station sets, comprising:

Station Controller circuitry with ringing detector, ringing counter, DTMF receiver and associated logic controller with, means to detect and to respond to ringing from said main switch line;

means to signal other said station sets via said Station Controllers;

means to detect and respond to signals from remote caller via said main switch line or from other said station sets;

means to assume individualized address identity via subscriber settable ID switches;

means to provide privacy to parties in communication by detecting said main switch line in use condition and consequently denying service request by said station set under said station controller's control;

means to allow an additional said station set to generate a special request signal to superimpose on said main switch line to alert said station sets already in communication upon barge-in situations.

5. A station addressing subsystem in accordance with claim 4, comprising:

identification switches for each station set with, means to change said identification switches by the subscriber at will, allows one or more similarly equipped said station sets to form a distributed PABX.

6. A station addressing subsystem in accordance with claim 4, comprising:

identification switches for each said station set with, means to define multiple identification code settings for each said station set;

provides the option of responding to group and broadcasting calls in addition to individually addressed calls.

* * * * *